United States Patent
Trika et al.

(10) Patent No.: US 6,630,931 B1
(45) Date of Patent: Oct. 7, 2003

(54) GENERATION OF STEREOSCOPIC DISPLAYS USING IMAGE APPROXIMATION

(75) Inventors: Sanjeev N. Trika, Hillsboro, OR (US); John I. Garney, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 883 days.

(21) Appl. No.: 08/935,314

(22) Filed: Sep. 22, 1997

(51) Int. Cl.[7] .................................................. G06T 15/00
(52) U.S. Cl. ................................... 345/419; 348/42
(58) Field of Search .................... 345/419, 422, 345/427; 348/42, 43, 44, 616, 617, 620, 845.1

(56) References Cited

U.S. PATENT DOCUMENTS

| | | | | |
|---|---|---|---|---|
| 4,329,708 A | * | 5/1982 | Yamamoto et al. | 348/617 |
| 4,345,272 A | * | 8/1982 | Shirota | 348/617 |
| 4,591,898 A | * | 5/1986 | DeBoer et al. | 348/617 |

OTHER PUBLICATIONS

Shaun Love, "Nonholographic, Autostereoscopic, Nonplanar Display of Computer Generated Images," Thesis submitted to North Carolina State University, 12 pages, 1990.
Stephen J. Adelson, "Stereoscopic Projections: Parallel Viewing Vectors, Rotations, and Shears," Los Alamos National Laboratory, Los Alamos, New Mexico, pp. 1–17, Dec. 22, 1993.
Stephen J. Adelson, et al., "Simultaneous Generation of Stereoscopic Views," *Computer Graphics Forum*, vol 10, pp. 3–10, 1991.
Stephen J. Adelson, et al., "Stereoscopic ray–tracing," *The Visual Computer*, vol 10, pp. 127–144, 1993.
Shaun Love, et al., Final Session of 1997 SIGGRAPH conference, presented on Aug. 3, 1997 in Los Angeles, CA, 23 pages.
Larry F. Hodges, et al., "Stereo and Alternating–Pair Techniques for Display of Computer–Generated Images," *IEEE CG &A*, Sep. 1985, pp. 38–45.

* cited by examiner

Primary Examiner—Mano Padmanabhan
(74) Attorney, Agent, or Firm—Blakely, Sokoloff, Taylor & Zafman LLP

(57) ABSTRACT

A method and apparatus for generating stereoscopic displays in a computer system. Each frame in a sequence of frames includes a left image and a right image, and each image includes a plurality of pixels. Depth information for objects depicted in the display is stored in a z buffer. Either the left image or the right image is computed as an approximation of the other using the depth information stored in the z buffer. The approximated image is alternated between the left and the right image on a frame-by-frame basis, so that the left and right image are each approximated every other frame. Pixels which are not filled in the approximated image are assigned values based on the corresponding pixels in the same (non-approximated) image from the preceding frame.

15 Claims, 7 Drawing Sheets

GENERATION OF STEREOSCOPIC DISPLAYS USING IMAGE APPROXIMATION

FIELD OF THE INVENTION

The present invention pertains to the field of visual display techniques for computer systems. More particularly, the present invention relates to techniques for generating stereoscopic images for virtual reality based applications.

BACKGROUND OF THE INVENTION

Modern computer systems are capable of generating images with a high degree of realism. Traditional computer display techniques have achieved realism by generating two-dimensional (2-D) views of three-dimensional (3-D) scenes or data. However, advancements in virtual reality technology and in computer processing power have drawn considerable interest to technology for generating 3-D images of scenes or data. Such technology is highly desirable for use in many applications, particularly in computer games and in complex, real-world simulations.

The manner in which the human brain interprets visually-perceived objects in 3-D is well-understood. The brain perceives objects in 3-D, because the eyes detect images in stereo. A stereo effect is caused by the differences between the images detected by the left eye and the right eye due to the separation between the two eyes. Consequently, it is well known that the perception of 3-D can be provided artificially by generating two spatially-offset 2-D images of the same subject and providing these images separately to the left and right eye.

Regardless of the medium used, existing 3-D techniques each generally employ some mechanism to ensure that each eye sees only the appropriate one of the two views. Various approaches have been used to provide this function, such as relatively simple and inexpensive anaglyphs (color-filtered eyeglasses), liquid crystal shutter glasses, and complex, expensive head-mounted devices which have a dedicated display for each eye.

Certain problems are associated with providing 3-D effects in the computer field, including relatively large requirements for processing power, efficiency, and memory capacity. In many existing systems, these requirements stem from the fact that two separate images are generated for each frame that is rendered, i.e., one for the left eye and one for the right eye, compared to only one image per frame for conventional, two-dimensional (2-D) computer displays. For each frame to be rendered for 3-D display, the model geometry must be rendered from both eye points. Thus, each triangle in a scene is transformed, lit, set up, and rasterized twice for each frame. As a result, 3-D stereo applications must either execute at half the potential geometry rate or at half the potential frame rate. Either result tends to adversely impact the degree of realism experienced by the user. Hence, what is needed is a fast, efficient, and inexpensive technique for generating 3-D displays in a computer system.

SUMMARY OF THE INVENTION

The present invention includes a method of generating a stereoscopic sequence of frames. Each frame in the sequence has a left image and a right image. For at least one frame in the sequence, one of the left image and the right image is an approximation of the other image. In the method, any pixel not filled in the approximated image is assigned the data values of a corresponding pixel in an image from a preceding frame. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus are described for generating fast, efficient, low-cost stereoscopic displays in a computer system. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram or other symbolic form in order to facilitate description of the present invention.

As will be described in detail below, the present invention improves the generation of 3-D stereoscopic images in a computer system by generating either the left or right image as an approximation of the other. The approximation is generated using depth information stored in a z buffer. Approximation of one of the left and right images eliminates the need to render two separate images for each scene to be rendered, thus reducing the amount of required memory and processing power in the computer system. This approach allows 3-D stereo applications to execute at full geometry and refresh rates, because the cost of generating the second image is substantially reduced.

Figure 1:
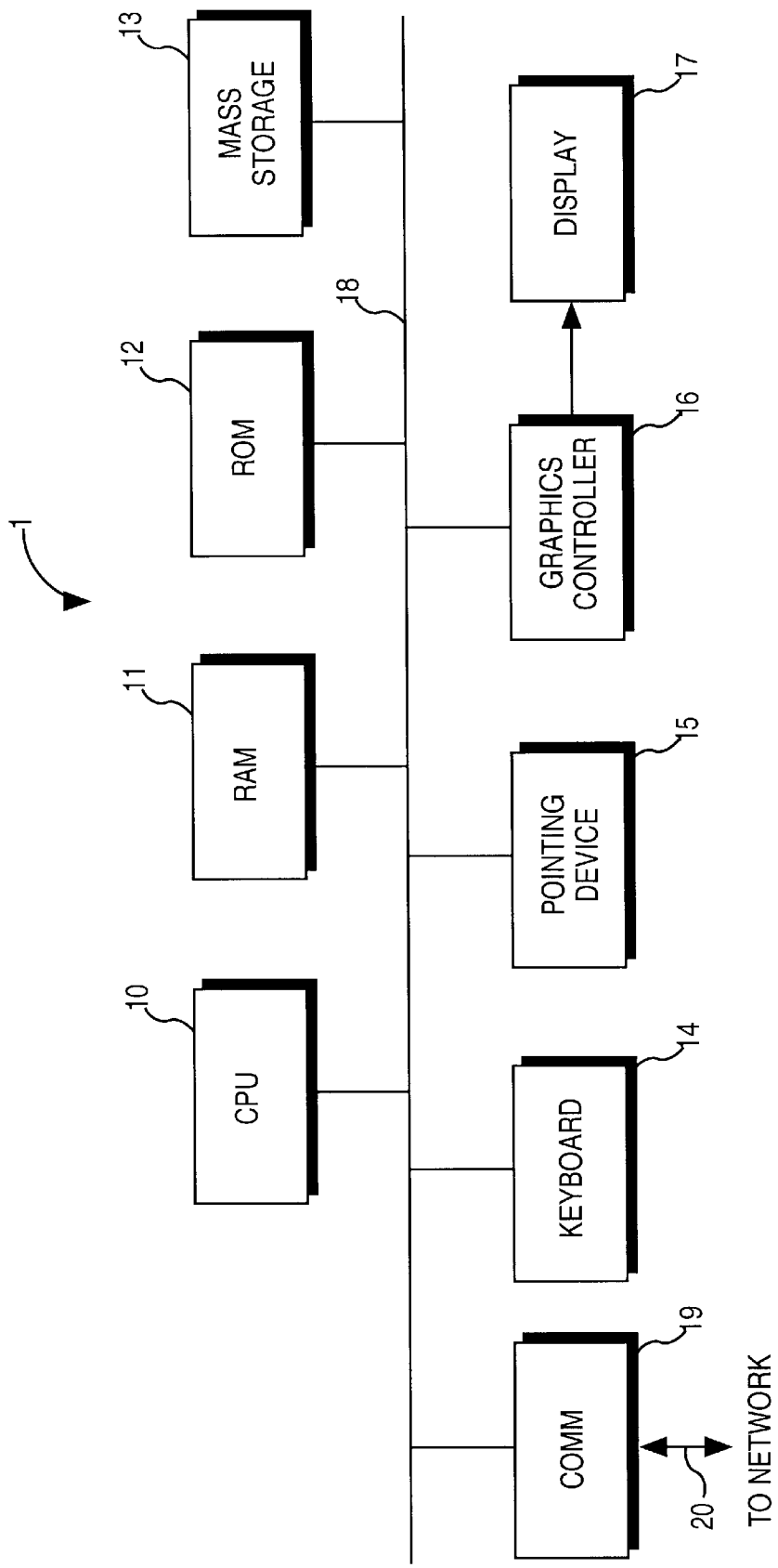
FIG. 1 is a block diagram of a computer system in which the present invention is implemented.

Refer to FIG. 1, which illustrates a computer system 1 in which the present invention is implemented according to one embodiment. The computer system 1 includes a central processing unit (CPU) 10, random access memory (RAM) 11, read-only memory (ROM) 12, and a mass storage device 13, each coupled to a bus 18. The bus 18 may actually comprise one or more physical buses interconnected by various bridges, controllers and/or adapters. Also coupled to the bus 18 are a communication device 19 for providing an interface for the computer system 1 to a network connection 20, a keyboard 14, a conventional pointing device 15, and a graphics controller 16. The graphics controller 16 is further coupled to a display device 17 to provide output display data to the display device 17, which displays information visually to a user. The display device 17 may be any conventional visual display device, such as a cathode ray tube (CRT), a liquid crystal display (LCD), etc., or an unconventional display such as a head-mounted or shutter glasses based stereo display.

The graphics controller 16, which may alternatively be referred to as a graphics accelerator or graphics adapter, provides various processing functions for generating complex (e.g., 3-D) visual displays. Mass storage device 13 may include any suitable device for storing large quantities of data in a nonvolatile manner, such as a magnetic, optical, or magneto-optical (MO) storage device, e.g., a magnetic disk or tape, Compact Disk ROM (CD-ROM), CD-R (CD-Recordable), Digital Versatile Disk (DVD), etc. The communication device 19 may be any device suitable for providing the computer system 1 with a communication interface with a network, such as a conventional telephone modem, a cable television modem, an Integrated Services Digital Network (ISDN) adapter, a Digital Subscriber Line (xDSL) adapter, an Ethernet adapter, or the like. The pointing device 15 may be any suitable device for positioning a cursor or pointer on the display device 17, such as a mouse, trackball, etc.

In one embodiment, the present invention is carried out in the computer system 1 in response to the CPU 10 executing sequences of instructions contained in memory. The memory may be any one of RAM 11, ROM 12, or mass storage device 13, or a combination of these devices. The instructions may be loaded into RAM 11 from a persistent store, such as mass storage device 13 and/or from one or more other computer systems (collectively referred to as "host computer system") over a network. For example, a host computer system may transmit a sequence of instructions to computer system 1 in response to a message transmitted to the host computer system over the network by computer system 1. As computer system 1 receives the instructions via the network connection 20, computer system 1 stores the instructions in memory. Computer system 1 may store the instructions for later execution or execute the instructions as they arrive over the network connection 20.

In some cases, the downloaded instructions may be directly supported by the CPU 10 of computer system 1. Consequently, execution of the instructions may be performed directly by the CPU 10. In other cases, the instructions may not be directly executable by the CPU 10. Under these circumstances, the instructions may be executed by causing the CPU 10 to execute an interpreter that interprets the instructions, or by causing the CPU 10 to execute instructions which convert the received instructions to instructions which can be directly executed by the CPU 10.

In an alternative embodiment, hardwired circuitry may be used in place of, or in combination with, software instructions to implement the present invention. For example, in certain embodiments of the present invention, aspects of the present invention may be included within, or carried out by, the graphics controller 16. Thus, the present invention is not limited to any specific combination of hardware circuitry and software, nor to any particular source for the instructions executed by a computer system.

In general, the difference between the left and right image of a stereoscopic image pair is simply a horizontal shift. The magnitude of this shift depends, in part, upon the apparent distance of the subject from the viewer (the depth). In certain computer graphics subsystems, depth information relating to displayable objects is stored in a special memory, known as a z buffer, the contents of which are used for purposes of visible surface determination. Consequently, approximated images according to the present invention are generated based, in part, upon depth information stored in a z buffer.

Figure 2:
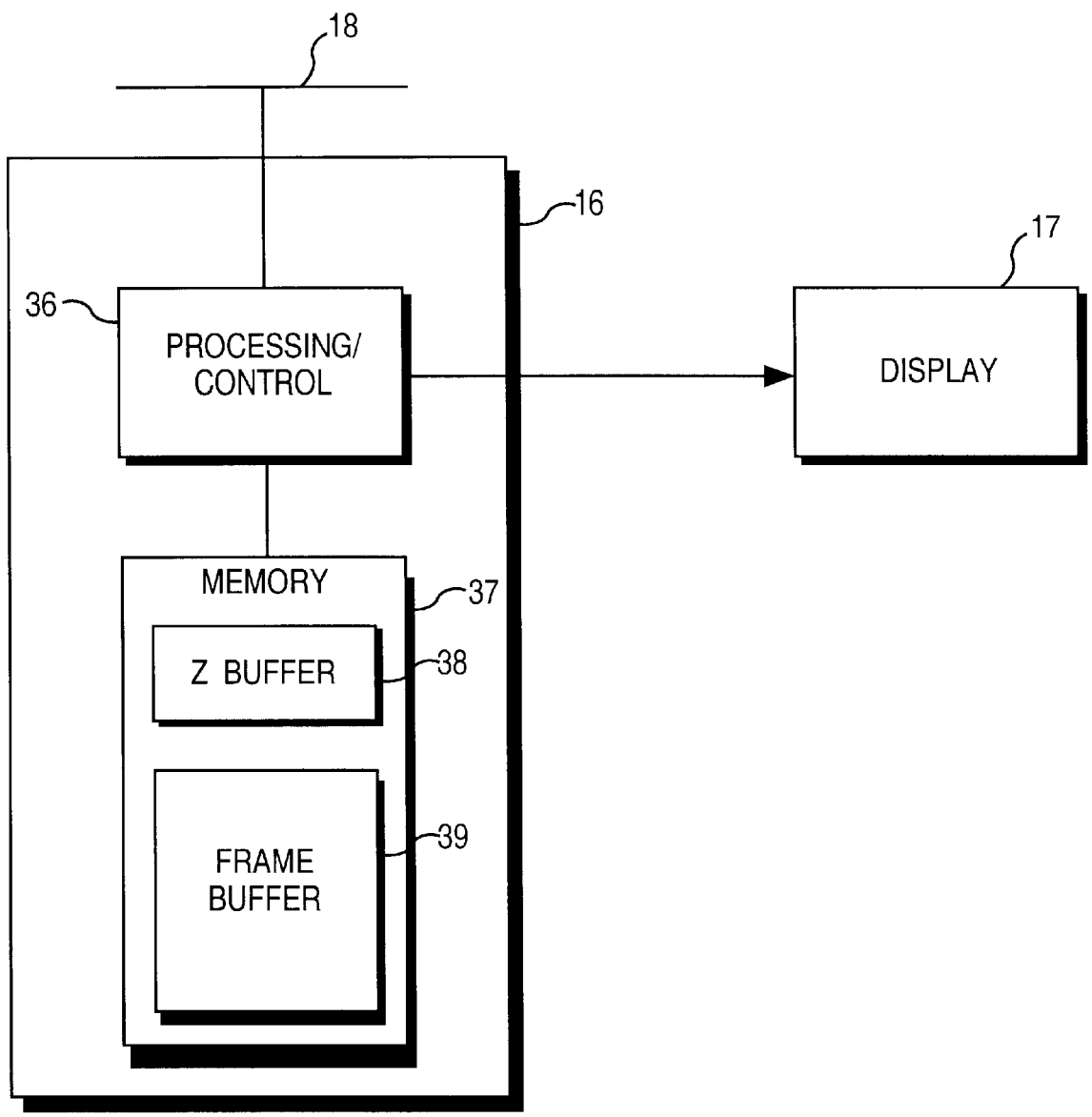
FIG. 2 is a block diagram illustrating components of a graphics controller, including a z buffer.

Referring now to FIG. 2, the graphics controller 16 is shown in greater detail. The graphics controller 16 includes a memory 37, and processing and control circuitry 36 coupled between the bus 18 and memory 37. The memory 37 includes a z buffer 38 for storing depth (z) values associated with individual pixels of a display as well as a frame buffer 39 for storing color values and other information of frames to be displayed. The display of display device 17 is periodically refreshed by the graphics controller 16 from the contents of the frame buffer 39. It should be noted that, although the z buffer 38 is shown within the graphics controller 16, in alternative embodiments the z buffer 38 may be located elsewhere within the computer system 1, such as in RAM 11.

It is useful at this point to consider certain aspects of generating 3-D images in a computer system. The process typically requires several transformations between coordinate systems, or "frames" of reference: 1) a local frame to world frame transformation; 2) a world frame to camera frame transformation; 3) a camera frame to window frame transformation; and 4) a window frame to viewport frame mapping. Techniques for performing these transformations are well-known in computer graphics. However, a discussion of certain aspects of these techniques may facilitate understanding the present invention and is therefore provided now with reference to FIGS. 3 through 5.

Figure 3:
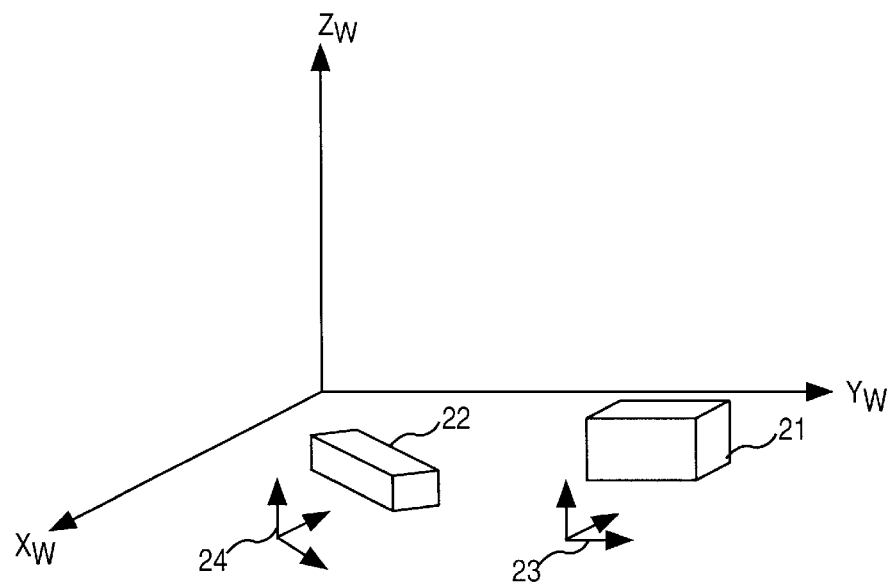
FIG. 3 illustrates a relationship between a world frame and local frames associated with two objects to be displayed.

During execution of a 3-D software application, an object to be displayed is initially represented in terms of its own local frame. Referring now to FIG. 3, consider a simple example in which a 3-D application represents two objects to be displayed, objects 21 and 22. Objects 21 and 22 are shown in FIG. 2 with respect to coordinate axis $x_w$, $y_w$, and $z_w$ of a world frame. The world frame refers to the overall environment maintained by the application, which may include a number of displayable objects. Objects 21 and 22 are initially referenced only to their own local frames, 23 and 24, respectively. Consequently, the initial transformation involves any rotation, translation, and scaling required to reference objects to the world frame.

Figure 4:
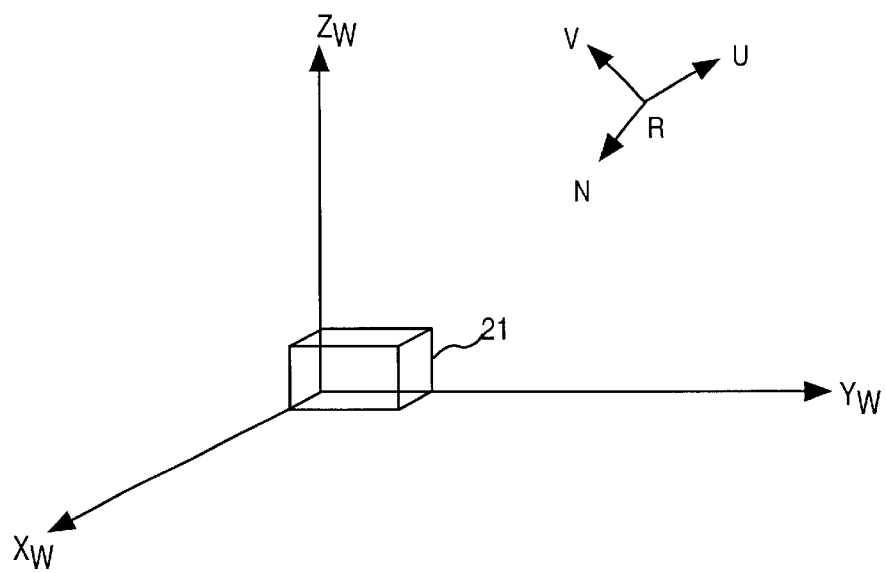
FIG. 4 illustrates a relationship between the world frame and a camera frame.

Referring now to FIG. 4, an object must next be transformed from the world frame to the camera frame. The camera frame essentially represents the frame of the viewer (or camera) and is defined by the coordinate axes u, v and n, with origin r. The position $\vec{P}_c$ of the camera is defined by the coordinates ($x_c$, $y_c$, $z_c$). Thus, the object 21, which is shown in FIG. 3 as conforming to the world frame, is transformed to the camera frame according to the well-known transformation of equation (1), in which $\vec{P}_w$ represents the coordinates ($x_w$, $y_w$, $z_w$) of an object in the world frame, and $M_{c\ldots w}$ represents a world-to-camera frame transformation matrix, which is well-known in the art of 3-D computer graphics.

$$\vec{P}_c = M_{c\ldots w} \vec{P}_w \tag{1}$$

Next, the object must be transformed from the camera frame to the window frame. The window frame represents the coordinate system of the portion of the data that the user wants to view. This transformation is represented by the well-known transformation equations (2) through (5), in which $\vec{P}_w$ represents the window frame coordinates ($X_w$, $Y_{\hat{w}}$, $Z_{\hat{w}}$) of the object, $M_{\hat{w}...c}$ represents a camera-to-window frame transformation matrix, which is well-known in the art of 3-D computer graphics, and $x_a$, $y_a$, $z_a$ and $w_a$ are intermediate coordinates.

$$\begin{bmatrix} y_a \\ y_a \\ z_a \\ w_a \end{bmatrix} = M_{\hat{w}...c} \begin{bmatrix} X_C \\ Y_C \\ Z_C \\ 1 \end{bmatrix} \quad (2)$$

$$X_{\hat{W}} = x_a/w_a \quad (3)$$

$$Y_{\hat{W}} = y_a/w_a \quad (4)$$

$$Z_{\hat{W}} = z_a/w_a \quad (5)$$

Figure 5A:
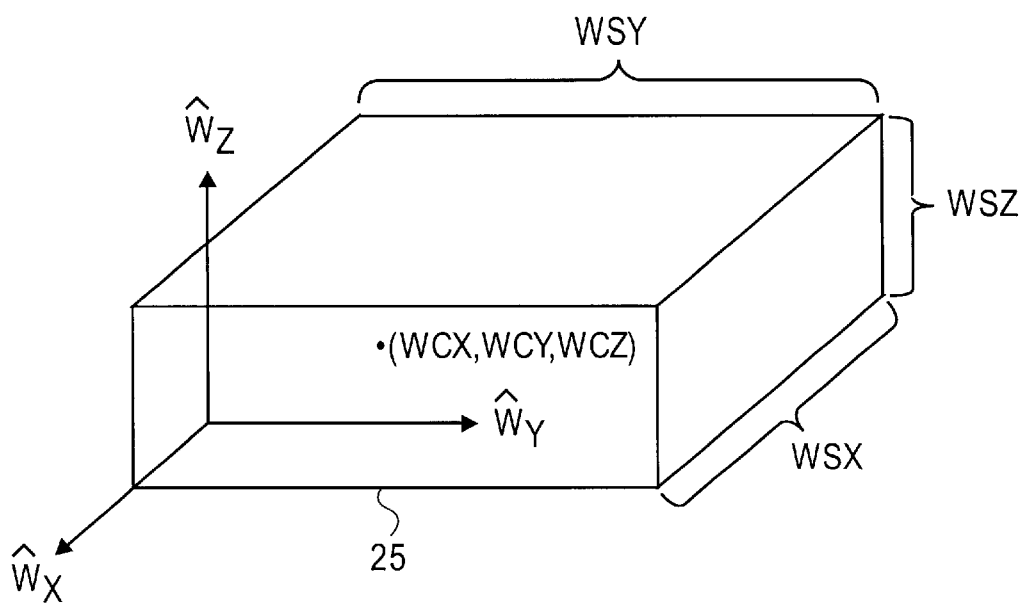
FIGS. 5A and 5B illustrate a relationship between a window frame and a viewport frame.
Figure 5B:
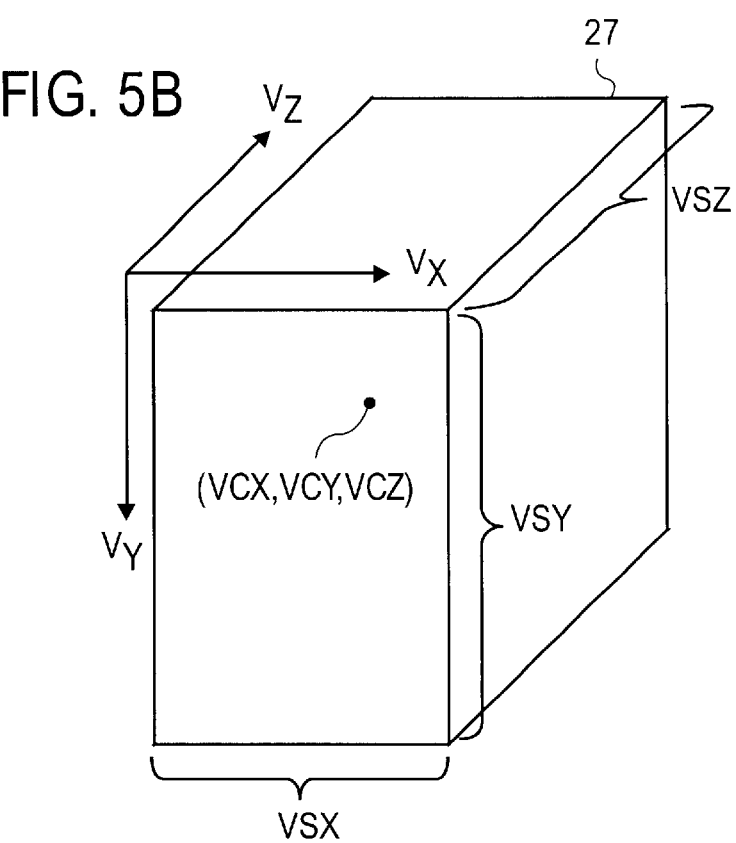

Finally, the object must be transformed from the window frame to the viewport frame. The viewport frame corresponds to the display area of the display device. FIGS. 5A and 5B illustrate the relationship between the window frame and the viewport frame with respect to window coordinate axes $\hat{W}_x$, $\hat{W}_y$, and $\hat{W}_z$. The transformation essentially involves translation and scaling. The window 25 is defined to be centered at coordinates (WCX, WCY, WCZ) and to have dimensions of WSX along the $\hat{W}_x$ axis, WSY along the $\hat{W}_y$ axis, and WSZ along the $\hat{W}_z$ axis. The viewport 27 is defined to be centered at coordinates (VCX, VCY, VCZ) and have dimensions VSX along the $V_x$ axis, VSY along the $V_y$ axis, and VSZ along the $V_z$ axis. The mapping of the window 25 to the viewport 27 is defined by equations (6) through (9), in which $\vec{P}_v$ represents the coordinates ($X_v$, $Y_v$, $Z_v$) of the object in the viewport frame.

$$\vec{P}_v = f_{v...\hat{w}}(\vec{P}_{\hat{w}})\text{tm} \quad (6)$$

$$Xv = VCX + (X\hat{w} - WCX)(VSX/WSX) \quad (7)$$

$$Yv = VCY - (Y\hat{w} - WCY)(VSY/WSY) \quad (8)$$

$$Zv = VCZ + (Z\hat{w} - WCZ)(VSZ/WSZ) \quad (9)$$

Figure 6:
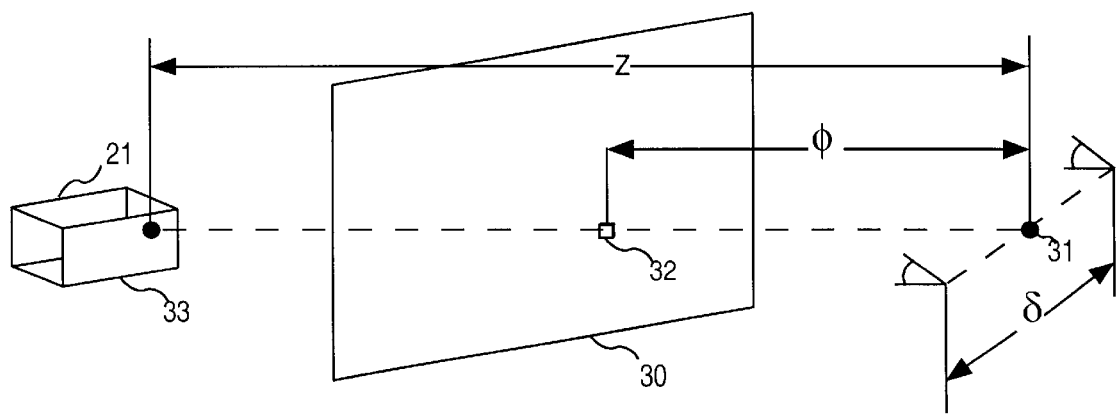
FIG. 6 illustrates relationships between the parameters of depth z, focal length $\phi$, and interocular distance $\delta$.

As noted above, the present invention provides for approximations of images based on depth values stored in a z buffer. The z buffer generally contains a depth value for each pixel of a frame to be displayed. Referring now to FIG. 6, the depth value Z for a given pixel 32 is defined herein as the apparent distance from the eye point (or camera point) 31 to the front surface 33 of a displayable object 21. Also shown in FIG. 6 are the focal length φ, which is defined as the distance from the eye point 31 to the image plane 30 in the viewing direction, and the interocular distance δ, which is defined as the distance between the left and right eye of the viewer.

The present invention provides that either the left image or the right image of a scene is approximated based on the other. However, for purposes of description only, it shall be assumed henceforth that the right image is approximated from the left image unless otherwise stated. As noted above, a corresponding left and right image differ only in terms of their x (horizontal) coordinates. Thus, if $X_V^L$ represents the x coordinate value of a pixel in the left image (in the viewport frame), then in accordance with the present invention, the x coordinate value $X_V^R$ of the corresponding pixel of the right image (in the viewport frame) can be obtained using equation (5), in which $Z_v$ represents the Z (depth) value associated with the pixel in the viewport frame, and $K_1$ and $K_2$ are given by equations (11) and (12), respectively.

$$X_V^R = X_V^L + K_1 + K_2 Z_v \quad (10)$$

$$K_1 = (\delta/\phi)(\text{VSX/WSX})(\text{WCZ} - \text{VCZ}(\text{WSZ/VSZ})) \quad (11)$$

$$K_2 = (\delta/\phi)(\text{VSX/WSX})(\text{WSZ/VSZ}) \quad (12)$$

Figure 7:
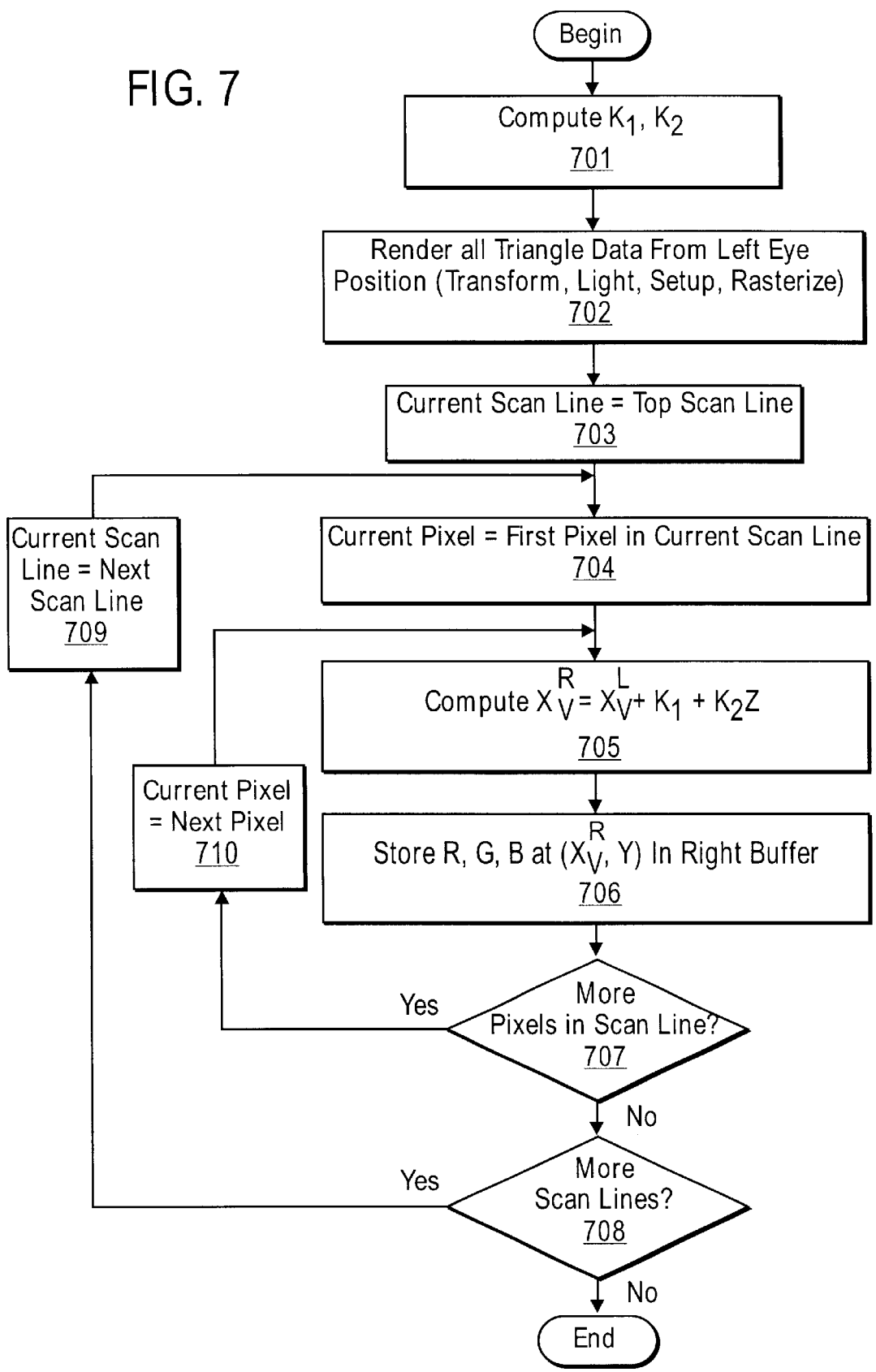
FIG. 7 is a flow diagram illustrating a routine for generating 3-D stereoscopic images, in which the right image is an approximation of the left image.

Refer now to FIG. 7 which illustrates a routine for generating the right image as an approximation of the left image in accordance with the present invention. Initially, in step 701 the parameters $K_1$ and $K_2$ are computed according to equations (11) and (12). Next, in step 702 the entire scene is rendered (including transformation, lighting, set up, and rasterization) as viewed from the left eyepoint. In step 703, the current scan line is set equal to the top scan line, and in step 704 the current pixel is set equal to the first pixel in the current scan line. In step 705, $X_V^R$ is computed according to equation (10). Next, in step 706 the red (R), green (G), and blue (B) values computed for pixel ($X_V^L$, $Y_v$) are stored at the location for pixel ($X_V^R$, $Y_v$) in a portion of the frame buffer allocated for the right image (the "right frame buffer"). If there are more pixels in the scanline (step 707), then the current pixel is set to the next pixel in step 710, and the routine repeats from step 705. If not, then if there are more scan lines (step 708), the current scan line is set to the next scan line in step 709, and the routine then repeats from step 704. If there are no more scan lines, the routine ends.

One problem with generating one image as an approximation of the other is that the data (e.g., R, G, B) for certain pixels in the approximated image may not be computed, i.e., those pixels may not be "filled". The reason for this effect is that a point on an object may be part of a hidden surface in only one of the two images. That is, there may be a pixel in the right image which represents a given point on a surface, yet there is no corresponding pixel in the left image which represents that point. Hence, if the right image is generated as an approximation of the left image, no pixel will be designated in the right image to represent that point. As a result, at least one pixel in the right image will not be filled. Pixels that are not filled might show up as black areas on the display, which is not desirable. Accordingly, it is desirable to have a technique for compensating for this effect. The present invention includes such a technique.

A stereoscopic 3-D display is comprised of a sequence of frames (not to be confused with the "frames" of reference discussed above), in which each frame includes a left image and a right image. Accordingly, one embodiment of the present invention provides that, rather than approximating the same image for every frame (i.e., always the right image or always the left image), the left image and the right image are alternately selected to be approximated on a frame-by-frame basis. For example, the right image may be approximated based on the left image for odd numbered frames, while the left image is approximated from the right image for even numbered frames. Further, for any pixel that is not filled in the approximated image, that pixel is assigned the data (e.g., R, G, B) of the pixel with the same location in the corresponding image from the immediately preceding frame, which image was not an approximation.

Thus, using this technique, the pixels in the approximated image will contain essentially correct (although in some cases slightly time-lagged) data. The only additional computation is for those pixels that are not filled, and for those pixels, the additional computation is only a single look-up in a color buffer. No additional memory is required, because the previous frame's color buffer is maintained anyway to serve as a front buffer for display to the monitor (all processing on a frame is traditionally done on a back buffer). Thus, improved image quality is achieved at minimal cost.

Figure 8:
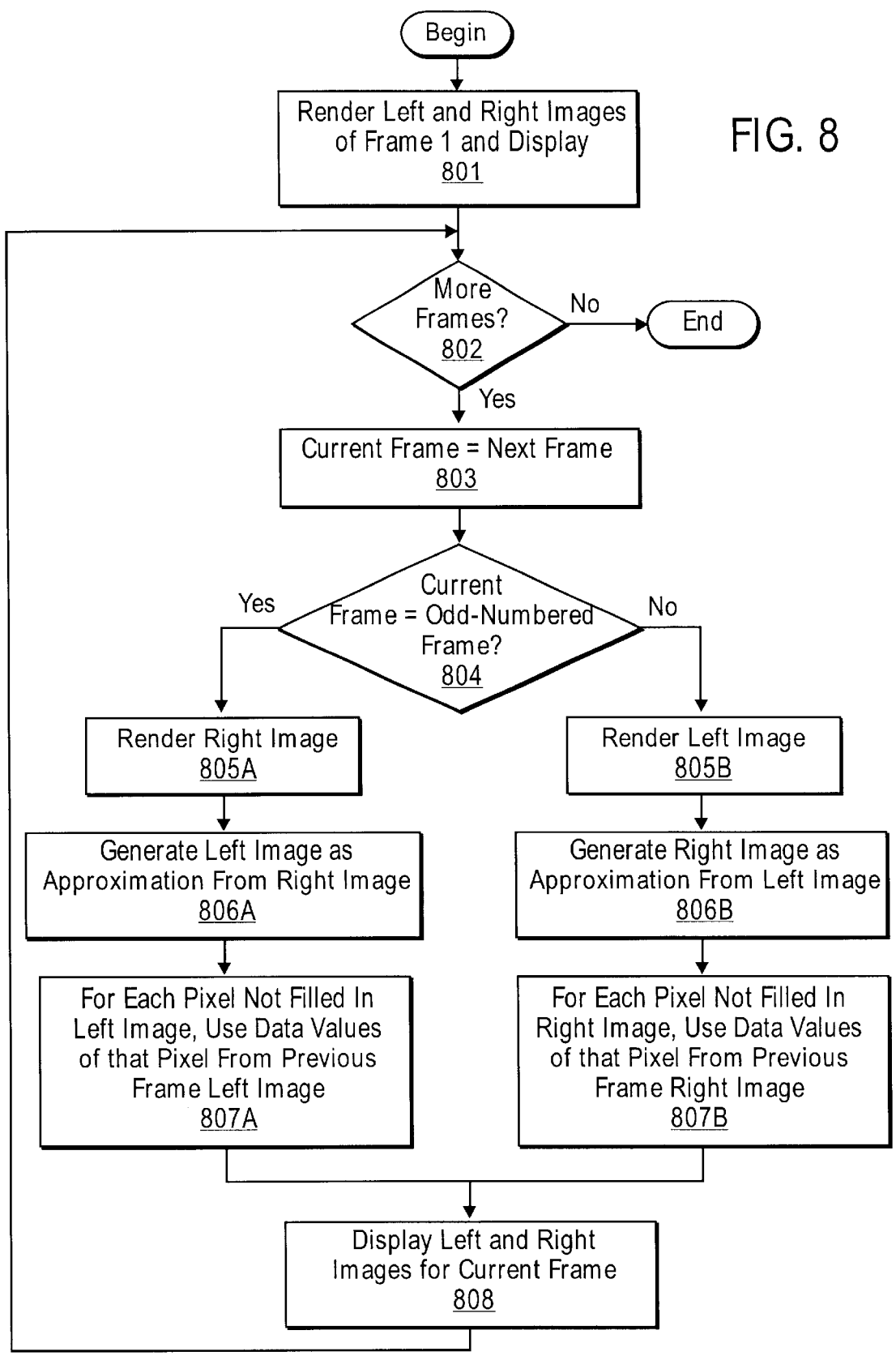
FIG. 8 is a flow diagram illustrating a routine for generating 3-D stereoscopic images in which the approximated image is alternated between the left image and the right image and unfilled pixels are assigned values.

FIG. 8 illustrates a routine for generating stereoscopic images using alternation of the approximated image. In step 801, the left and right images of the first frame (frame 1) are rendered and dislayed. In step 802, if there are more frames to display, then the routine proceeds to step 803; otherwise the routine ends. In step 803, the current frame is set equal to the next frame. If the current frame is an odd-numbered frame (i.e., frame 1, 3, 5, etc.) (step 804), then the routine proceeds to steps 805A, 806A, and 807A. If, however, the current frame is an even-numbered frame (i.e., frame 2, 4, 6, etc.), then the routine proceeds to steps 805B, 806B, and 807B.

Referring to steps 805A, 806A, and 807A, the right image is first rendered in step 805A. In step 806A, the left image is generated as an approximation from the right image in the manner described above. In step 807A, for each pixel that is not filled in the left image, that pixel is assigned the data values of that pixel from the previous frame's left image.

Similarly, in step 805B, the left image is rendered. In step 806B, the right image is generated as an approximation from the left image. In step 807B, for each pixel that is not filled in the right image, that pixel is assigned the data values of that pixel from the previous frame's right image.

Following either step 807A or 807B, the left and right images from the current frame are displayed in step 808, and the routine proceeds again to step 802.

Thus, a method and apparatus have been described for generating fast, low-cost stereoscopic displays in a computer system. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of generating a stereoscopic sequence of frames, each frame in the sequence having a left image and a right image, wherein for at least one frame in the sequence, one of the left image and the right image is an approximation of the other, the method comprising the steps of:

identifying any pixels not filled in the approximation image; and assigning, to any pixel not filled in the approximation image, the data values of a corresponding pixel in an image from a preceding frame.

2. A method according to claim 1, wherein the image from a preceding frame comprises a non-approximated image from a preceding frame.

3. A method according to claim 2, wherein the non-approximated image from a preceding frame comprises a non-approximated image from the immediately preceding frame.

4. A method according to claim 3, wherein the non-approximated image from the immediately preceding frame corresponds to the same eyepoint as that of the approximation image.

5. A method of generating a stereoscopic sequence of frames, each frame having a left image and a right image, the method comprising the steps of:

for each frame of a first set of frames in the sequence, generating one of the left image and the right image as an approximation of the other of the left image and the right image;

for each frame of a second set of frames in the sequence, generating said other of the left image and the right image as an approximation of said one of the left image and the right image;

identifying a pixel not filled in one of the images generated as an approximation; and assigning a value to the pixel not filled based on the value of a corresponding pixel in the same image of a previous frame.

6. A method according to claim 5, further comprising the step of performing the generating steps so as to alternate the one of the left image and the right image that is approximated on a frame-by-frame basis.

7. A method according to claim 6, wherein each of the approximations is based on depth information stored in a z buffer.

8. A method according to claim 7, wherein the previous frame is the immediately preceding frame.

9. A method of generating a stereoscopic display, the display including a sequence of frames, each frame having a first image of a scene corresponding to one of a left eye view and a right eye view and a second image of the scene corresponding to the other of the left eye view and the right eye view, each of the first and second images formed by a plurality of pixels, the method comprising the steps of:

(a) rendering the first image of a first frame of the sequence of frames, including determining a value for each of the pixels of the first image;

(b) rendering the second image of the first frame as an approximation of the first image, including approximating a value for each of the pixels of the second image based on the value of a corresponding pixel of the first image;

(c) rendering the second image of a second frame of the sequence of frames, including determining a value for each of the pixels of the second image of the second frame;

(d) rendering the first image of the second frame as an approximation of the second image of the second frame, including approximating a value for each of the pixels of the second image of the second frame based on the value of a corresponding pixel of the first image of the second frame;

(e) repeating steps (a) through (d) for different frames of the sequence of frames, to render each frame of the sequence of frames;

(f) identifying any pixels not filled in each of the images generated as an approximation; and (g) for each pixel not filled, assigning said pixel a value based on a corresponding pixel of the same image from the immediately preceding frame.

10. An apparatus for generating a stereoscopic sequence of frames, each frame having a left image and a right image, the apparatus comprising:

a memory storing the frames of the sequence;

processing circuitry coupled to the memory, the processing circuitry generating, for each frame of a first set of frames in the sequence, one of the left image and the right image as an approximation of the other of the left image and the right image, the processing circuitry generating, for each frame of a second set of frames of the sequence, said other of the left image and the right image as an approximation of said one of the left image and the right image, the processing circuitry assigning a value to each pixel not filled in each of the images generated as an approximation, based on a corresponding pixel from a previous frame.

11. An apparatus according to claim 10, the processing circuitry alternating the one of the left image and the right image that is approximated on a frame-by-frame basis.

12. An apparatus according to claim 10, wherein each of the approximations is based on depth information stored in a z buffer.

13. An apparatus for generating a stereoscopically displayable sequence of frames, each frame having a left image and a right image, the apparatus comprising:

means for computing, for each frame in the sequence, one of the left image and the right image for the frame and for generating the other of the left image and the right image of the frame as an approximation of the computed left or right image;

means for determining which one of the left and right images is to be approximated for a given frame based on the position of the frame in the sequence;

means for identifying any pixels not filled in one of the images generated as an approximation; and means for assigning each pixel not filled in the image generated as an approximation a value based on a corresponding pixel from a corresponding image in a previous frame.

14. An apparatus according to claim 13, wherein the means for generating the other of the left image and the right image of the frame as an approximation of the computed left or right image comprises means for determining a value for each pixel of said other of the left image and the right image as an approximation of the value of a corresponding pixel of said one of the left and right image.

15. An apparatus according to claim 13, wherein each of the approximations is based on depth information stored in a z buffer.

* * * * *

UNITED STATES PATENT AND TRADEMARK OFFICE
CERTIFICATE OF CORRECTION

PATENT NO. : 6,630,931 B1
DATED : October 7, 2003
INVENTOR(S) : Trika et al.

It is certified that error appears in the above-identified patent and that said Letters Patent is hereby corrected as shown below:

Column 5,
Line 35, delete "tm".

Signed and Sealed this

Second Day of March, 2004

JON W. DUDAS
*Acting Director of the United States Patent and Trademark Office*